United States Patent [19]
Crosskey et al.

[11] Patent Number: 6,035,281
[45] Date of Patent: Mar. 7, 2000

[54] SYSTEM AND METHOD OF MULTIPARTY BILLING FOR WEB ACCESS

[75] Inventors: James P. Crosskey, Ridgefield, Conn.; Mark Gee-Gwo Mei, Yorktown Heights, N.Y.; Harish Ragavan, Stamford, Conn.; Kun-Lung Wu, Yorktown Heights; Philip Shi-lung Yu, Chappaqua, both of N.Y.

[73] Assignee: International Business Machines Corporation, Armonk, N.Y.

[21] Appl. No.: 08/877,021

[22] Filed: Jun. 16, 1997

[51] Int. Cl.⁷ ..................................................... G06F 17/60
[52] U.S. Cl. ................................................ 705/14; 705/40
[58] Field of Search ................................. 705/10, 14, 40; 345/329, 335; 370/261, 321; 379/114; 380/49; 395/200.31, 200.33, 615, 701

[56] References Cited

U.S. PATENT DOCUMENTS

| | | | |
|---|---|---|---|
| 5,631,904 | 5/1997 | Fitser et al. | 370/261 |
| 5,706,507 | 1/1998 | Schloss | 395/615 |
| 5,757,784 | 5/1998 | Liebowitz et al. | 370/321 |
| 5,774,660 | 6/1998 | Brendel et al. | 395/200.31 |
| 5,774,869 | 6/1998 | Toader | 705/10 |
| 5,793,966 | 8/1998 | Amstein et al. | 395/200.33 |
| 5,796,393 | 8/1998 | MacNaughton et al. | 345/329 |
| 5,806,043 | 9/1998 | Toader | 705/14 |
| 5,819,092 | 10/1998 | Ferguson et al. | 395/701 |
| 5,819,285 | 10/1998 | Damico et al. | 707/104 |
| 5,821,927 | 10/1998 | Gong | 345/335 |
| 5,822,434 | 10/1998 | Caronni et al. | 380/49 |
| 5,822,539 | 10/1998 | Van Hoff | 395/200.66 |
| 5,828,737 | 10/1998 | Sawyer | 379/114 |
| 5,845,267 | 12/1998 | Ronen | 705/40 |

FOREIGN PATENT DOCUMENTS 9018853A 1/1997 Japan ................................ H04N 7/16

OTHER PUBLICATIONS

NetXchange Launches Revolutionary Internet Communication Switching Architecture and Messaging Application (Business Wire; Dialog file 621, document 00659114), Aug. 26, 1996.

MCI Sees an End to Flat–Payment Billing (Electronic Engineering Times n926, pp 106–10; dialog file 15, document 01333182), Nov. 4, 1996.

Geffen Records, CompuServe and Aerosmith Make History with First Song Available Exclusively via Information Highway (PR Newswire; dialog file 148, document 07280679), Jun. 15, 1994.

ZiffNet: New Name, New Lower Price (dialog file 16, document 05910489), Oct. 1, 1995.

CompuServe Updates (dialog file 15, document 01122497), Dec. 1995.

Weaving the Web Fantastic II (InternetWeek, dialog file 16, document 07190770), Nov. 1997.

"Nikkei Communications," No. 233 (Nov. 4, 1996) p. 74.
"Nikkei Communications," No. 221 (May 6, 1996) p. 55.
"Nikkei Communications," No. 224 (Jun. 17, 1996) p. 78.

*Primary Examiner*—Emanuel Todd Voeltz
*Assistant Examiner*—Alexander Kalinowski
*Attorney, Agent, or Firm*—David M. Shofi; Kevin M. Jordan

[57] ABSTRACT

A system and method for billing one or more participating parties for client access to the internet is disclosed including the steps of identifying at least one of the one or more participating parties as being responsible for the billing, allocating a share of the billing to each responsible participating party based on a predetermined function and computing a billing amount for each of the responsible participating parties based on a function of the share and a client bandwidth usage.

44 Claims, 4 Drawing Sheets

SYSTEM AND METHOD OF MULTIPARTY BILLING FOR WEB ACCESS

The present invention generally relates to the billing methods for accessing the World Wide Web of the Internet and, more particularly, to the sharing of billing for accessing the World Wide Web among multiple parties involved in providing information services and/or conducting electronic commerce on the World Wide Web.

Glossary of Terms

While dictionary meanings are generally implied for the terms included herein, the following summary includes demonstrative definitions:

Internet: The network of networks and gateways that use the TCP/IP suite of protocols.

Client: A computer which issues commands to the server which performs the task associated with the command.

Server: Any computer that performs a task at the command of another computer. A Web server typically supports one or more clients.

Network protocols: Standard methods for machines to communicate with one another. The protocols indicate how data should be formatted for receipt and transmission across networks. Heterogeneous machines can communicate seamlessly over a network via standard protocols. Examples of standard Internet protocols include HTTP ("Hypertext Transfer Protocol"), SMTP ("Simple Mail Transfer Protocol") and FTP ("File Transfer Protocol").

World Wide Web (WWW or Web): The Internet's application that permits users seeking information on the Internet to switch from server to server and database to database by clicking on highlighted words or phrases of interest (hyperlinks). An Internet Web server supports clients and provides information. The Web can be considered as the Internet with all of the resources addressed as Uniform Resource Locators (URLs) and which uses HTML (see below) to display the information corresponding to URLs and provide a point-and-click interface to other URLs. On the Web, "browsers" constitute client programs while the programs sending back information to the browser constitute server programs.

Universal Resource Locator (URL): A way to uniquely identify or address information on the Internet. Can be considered to be a Web document version of an e-mail address. URLs can be accessed with a Hyperlink. An example of a URL is "http://www.arun.com:80/table.html". A URL has four components. Starting from the left, the first specifies the protocol to use, separated from the rest of the locator by a ":". Next is the hostname or IP address of the target host; this is delimited by the "//" on the left and on the right by a "/" or optionally a ":". The port number is optional, and is delimited on the left from the hostname by a ":" and on the right by a "/". The fourth component is the actual file name or program name. In this example, the ".html" extension means that this is an HTML file.

HyperText Markup Language (HTML): The language used by Web servers to create and connect documents that are viewed by Web clients. HTML uses Hypertext documents.

Hypertext transfer protocol (HTTP): An example of a stateless protocol, which means that every request from a client to a server is treated independently. The server has no record of previous connections. At the beginning of a URL, "http:" indicates the file contains hyperlinks.

Internet Browser or Web browser: A graphical interface tool that runs Internet protocols such as http, and displays results on the client's screen. The browser can act as an Internet tour guide, complete with pictorial desktops, directories and search tools used when a user "surfs" the Internet. In this application, the Web browser is a client service which communicates with the World Wide Web.

HTTP daemon (HTTPd): A Web Server having Hypertext Markup Language and Common Gateway Interface capability. The HTTPd is typically supported by an access agent which provides the hardware connections to machines on the intranet and access to the Internet, such as TCP/IP.

BACKGROUND OF THE INVENTION

For a user to access information or conduct electronic commerce on the World Wide Web, he/she typically uses a (client) computer to dial up through a phone line, cable or other means to the server computer of an on-line service provider (OLSP). The OLSP server computer is then connected to the Internet where the servers of content providers and merchants reside. Requests from the user and results from the content/merchant servers are all passed through the server computer of the OLSP. In providing the services for accessing the Web, the OLSP usually charges the user a service fee.

To charge users for accessing the Web, OLSPs generally adopt two popular billing methods. Users are charged either by a flat rate (e.g. $19.95 per month) or by connection time (e.g. $1.95 per hour). However, there are shortcomings associated with these two billing approaches. One problem with the flat rate billing method is that it does not reflect users' prioritizations of Internet resources. Furthermore, this method does not encourage users to save Internet resources. As a result, heavy users of the Web can potentially monopolize part of the Internet resources, thus preventing others from accessing them. On the other hand, the connection time billing method is also unfair to the users who are continuously charged even though they may not receive any information from the Web due to waiting time caused by either network congestion or server unavailability. Indeed, as more and more people are "surfing" the Web, the network congestion problem is becoming more severe. Finally, these billing methods fail to provide a method of credit accumulation to offset fee payment for accessing the Web in order to attract Web traffic and improve the business value of the Internet.

In order to provide a billing method that is fairer to the user and that can also prevent heavy users from monopolizing part of the Internet resources, the OLSP should charge the user based on his/her actual usage. However, simple usage-based pricing may discourage the user from exploring the Web because he/she may be afraid of potentially large charges. Thus, there is a need for a better usage-based billing method that will encourage or entice the user to explore the Web, thus creating more business for the content providers/merchants and others in the electronic marketplace. There is also a need for a multiparty billable usage-based method [and system] for providing access to the World Wide Web of the Internet and sharing the accessing cost/credit.

SUMMARY OF THE INVENTION

This invention presents a usage-based system and method for an OLSP or other party to share Web access billings among multiple participating parties involved in a Web network computer system. These participating parties may include OLSPs, content providers/merchants, advertisers and users. A novel billing method that allows credit accumulation to offset payments is preferably provided to track accurate web usage through standard web logging mechanisms. Web pages can be used to display billing responsibility of the users for accessing the Web. Users, as a result, have more power to decide which content and/or commercial advertisements they want to access. The present invention offers not only the combined capabilities regular telephone, 1-800, 1-900, prime time, non-prime time, mobile phone, pay-per-view billing, but also capabilities of dynamic, real-time, interactive, unscheduled, subsession, usage-based and multiparty sharing features for Web access billings.

While, in telephone billing, the concept of 800 and 900 numbers has been used to differentiate the billing parties, this is done based on connection time or flat fee. Although, for cable TV, the pay-per-view method is charged on a user session basis to the viewer, only a single party, the viewer, is responsible for the billing. Finally, while cellular phone systems are also user session-oriented with both the caller and the receiver sharing the bill, the billable parties do not change dynamically once a call session is initiated and the splitting of the bill follows a prespecified convention and is based on connection time.

The present invention also differs from the traditional on-line service model like America On-line or Prodigy where the service provider acts like a middle man to collect the bill from the subscribers and then redistribute the income among different content providers. There, the access providers divide the billing of the access costs of users among multiple parties and bill each party on its share of the costs. In the present invention, the focus is on collecting from multiple parties instead of redistributing among multiple parties. In addition, the payment to a content provider/ merchant in the traditional on-line service provider model is based on the number of subscribers the on-line service provider lines up, while the present invention is based on the actual usage by the users or subscribers.

The present invention provides for a system and method for billing one or more participating parties for client access to the internet, the method comprising the steps of identifying at least one of the one or more participating parties as being responsible for the billing, allocating a share of the billing to each responsible participating party based on a predetermined function and computing a billing amount for each of the responsible participating parties based on a function of the share and a client bandwidth usage. Preferably, the billing amount is further based on the time of day of the access.

Preferably, a client session comprises a sequence of subsessions which are dynamically initiated and terminated by the client, each subsession having a duration and the billing amount is based on the duration of each subsession.

It is also preferable for the system to track an actual size of a data transfer associated with a web page access and compute the billing amount of each responsible participating party as a function of the actual size.

The system of the present invention preferably identifies a hyperlink source and a hyperlink target for each access.

The method of the present invention preferably includes the steps of identifying at least one of the responsible participating parties as receiving bonus credit and applying the bonus credit to offset any billing amount. The applying step is preferably based on a function of a hyperlink source web page.

The tracking step of the invention preferably includes the step of analyzing access logs and referrer logs to identify each web access and corresponding actual size.

The participating parties preferably include a client, an on-line service proxy server, one or more content provider servers and/or one or more advertisers. Free client access to localized object insertions by the on-line service proxy server is preferably provided. Clients are preferably identified based on a static IP address or a dynamic IP address.

Each client's billing amount is preferably based on a function of a client service level such as real-time support, transmission speed, a content filtering requirement, and/or an advertisement selection requirement.

In accordance with another aspect of the present invention, the system provides an indication, through a client interface on a source web page, whether a client will be responsible for payment of a billing amount for access to a target web page. This indication is preferably accomplished by presenting different appearances of object linkages indicating whether the client is responsible for the payment of a billing amount and indicating the billing amount to the client. The presentation of the appearances of the object linkages may be done through different coloring, special marks or different graphical representations.

It is preferable that one of the participating parties is an on-line service proxy server which retrieves a remapped version of the source web page from its cache storage when a client request is received. Preferably, the remapped source web pages containing the object linkages are left intact without the need to prescan and analyze the content of the source web pages and the URL of the target web page is maintained.

Finally, it is preferable to arrange the on-line service proxy servers hierarchically and the objects on the source web pages are remapped by each proxy server to indicate whether the client is one of the responsible participating parties, the remapped objects are stored in the hierarchically arranged on-line service provider proxy servers according to the geographic connection to the subject matter of the objects so that the remapping of objects is localized at each proxy server and the same original URL for each remapped object is maintained.

BRIEF DESCRIPTION OF THE DRAWING

These and other features and advantages of the present invention will become apparent from the following detailed description taken in conjunction with the accompanying figures, wherein:

FIG. 2b is a more detailed flow diagram of step 203 of the method of FIG. 2a;

DETAILED DESCRIPTION

Figure 1:
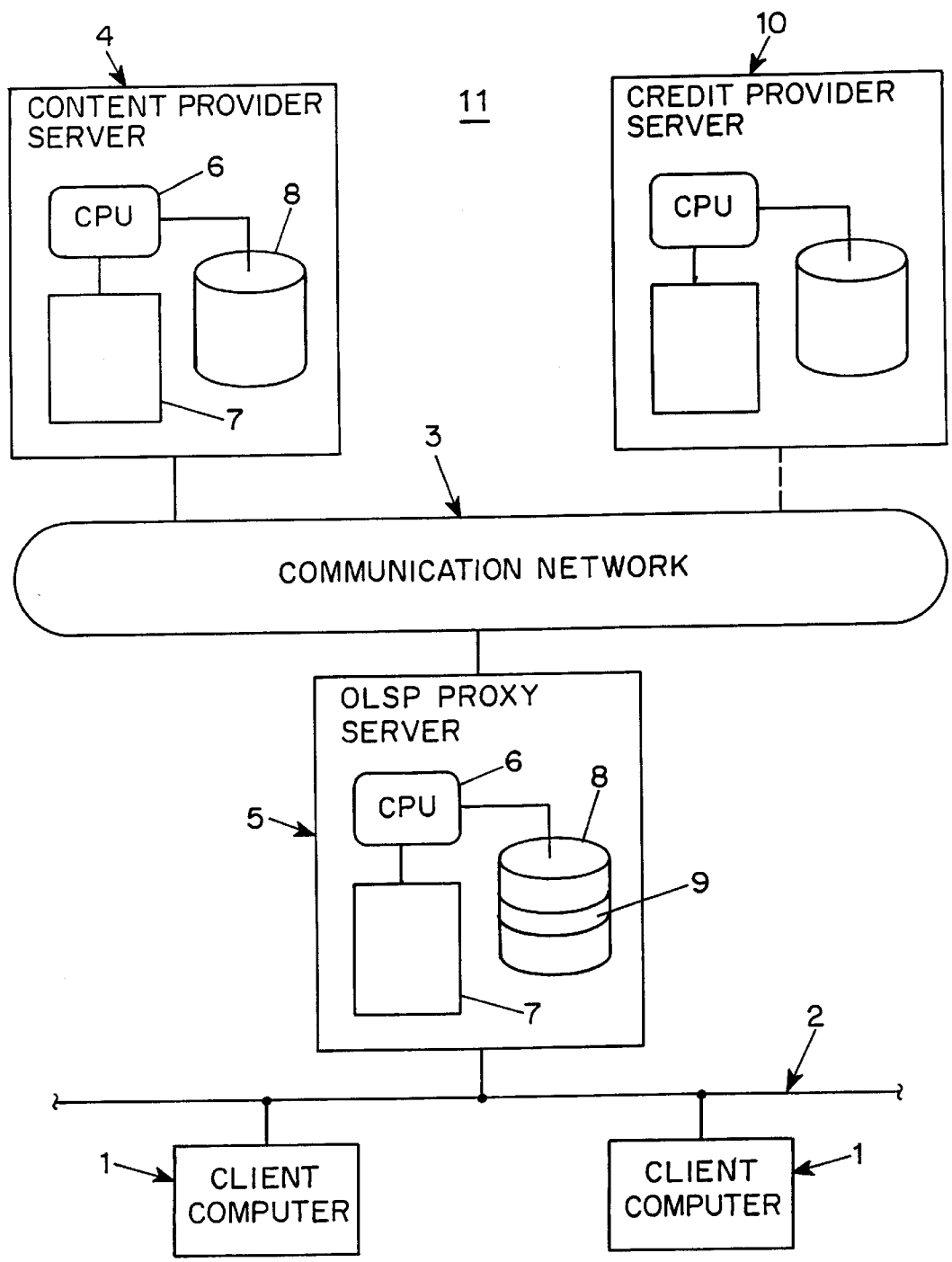
FIG. 1 is a schematic diagram of a data processing system in accordance with the present invention.

In FIG. 1, a graphical representation of a network computer system 11 which may be utilized to implement the present invention is depicted. Network computer system 11 includes one or more content provider (or merchant) servers 4 and an on-line service provider (OLSP) proxy server 5 connected via an Internet network 3. The servers communicate with each other following specific protocols known in the art, such as HTTP and TCP/IP. Those skilled in the art will appreciate that there are a multitude of variations available to create the Internet connection between the servers. In order to provide payment/credit among different parties, a credit provider server 10 may also be connected to the network 3. The credit provider server 10 performs credit verification for the content provider server 4 and the OLSP proxy server 5, computes the net payment among the different parties and provides for payment of the respective bills.

Each content provider server 4 is preferably a stateless hypertext server system that provides services to a plurality of client computers 1. An example of such a system is a World Wide Web server which includes a central processing unit 6, main memory 7 and disk drive 8. The server 4 stores hypertext objects, such as HTML files, graphical icon files (e.g. GIF files), audio, video objects and CGI programs, on its local disk 8 and provides these objects to various clients using HTTP through the Internet 3. Each client computer 1 is a personal computer or workstation as is known to those skilled the art and preferably incorporates a software browser, such as the Netscape Navigator offered by Netscape Communications, Inc., to retrieve and display hypertext objects through the OLSP proxy server 5.

According to an embodiment of the present invention, a client computer 1 dials up with a modem (not shown) over either a cable or telephone line 2 to connect to the OLSP proxy server 5. Through the OLSP proxy server 5, the users of the client computers can access hypertext objects stored on the content provider servers 4. In order to speed up the retrieval process, the OLSP proxy server 5 may cache some of the hypertext objects on its own local disk 8 using caching algorithms generally known in the art. If a client computer 1 requests objects which have been cached, the OLSP proxy server 5 returns the cached objects to the client computer 1. If not available locally, then the OLSP proxy server 5 forwards the request on behalf of the client computer 1 to the destination content provider server 4 and sends the results back to the client computer 1 once the requested objects are retrieved from the disk drive 8 of the content provider server 4.

Therefore, the OLSP proxy server 5 retrieves hypertext objects from storage on content provider servers 4 or from its own hypertext object store cached on disk 8 and sends back the results to the client computers 1. The hypertext object store can be in the form of a file system or a database system. The hypertext objects are typically stored in non-volatile storage and can be retrieved into main memory when requested.

The proxy server 5, which is also a kind of hypertext server, uses a conventional HTTPd to process requests from client computers 1. An example of an HTTPd is the Internet Connection Server, sold by IBM. For each hypertext request that is processed, the proxy server 5 logs certain information about the request in a request log located in its main memory 7. An agent program can be used to retrieve the hypertext request log from the main memory 7, convert the data into a format readable by the system of the present invention and store the fields and records in a hypertext object request log data base in disk drive 8. The hypertext object request log data base can be spooled to large capacity storage devices, such as tapes, periodically for backup purposes and to free up space in disk drive 8.

The usage-based multiparty billing logic 9 of the present invention is preferably embodied as computer readable program code stored on disk drive 8 of the proxy server 5. Alternatively, it may be stored on other conventional magnetic media such as a diskette or optical media such as a CD-ROM. The billing logic 9 can also be stored on the content provider servers 4 to permit verification or negotiation of payments with the OLSP. Those skilled in the art will appreciate that the billing logic 9 also can be stored solely on the content provider server in an environment lacking a proxy server and function as described hereinbelow.

In Internet accesses through a web browser, each web page access constitutes a subsession and clicking of a HTTP link controls the termination of the previous and the initiation of the next subsession. According to the present invention, billing is based on the bandwidth (actual) usage by the client of the page accessed.

According to a web server logging mechanism, for each hypertext object access, a plurality of information about the access is recorded, including the requester address, the hyperlink source (i.e., the hypertext object that refers the client to the target object), the hyperlink target (i.e., the hypertext object being accessed) and the time stamp of the access. The hyperlink source and hyperlink target form a hyperlink access pair (V_current_stop, V_next_stop), representing a step in the user traversal path on the hypertext objects. The hyperlink access pair represents a decision and an action by a Web user, denoted as user_id, to move from the current URL, denoted by V_current_stop, to the next URL, denoted by V_next_stop. To link all access pairs between when a user logs in and when the user logs out from the OLSP proxy server, a traversal path P(user_id, session_id_s) can be formed. A traversal path can be defined as (V_login_stop_0, V_stop_1, V_stop_2, ... V_logout_stop_n), indicating all the hypertext objects visited by the user during that login session identified by session_id_s. Once a traversal path P(user_id, session_id_s) is identified, the billable events related to the login session can be calculated.

According to the present invention, other parties may share the bill with the user. To illustrate, the URL page denoted by V_current_stop, the original content provider may be willing to absorb the accessing cost for the user if the page is an advertisement. Similarly, the OLSP may be willing to share part of the cost (in a form of discount to the user) because the content page may have previously been locally cached. To permit this bill sharing, a hyperlink access pair HAP(user_id, session_id, hap_id)=(V_current_stop, V_next_stop) is mapped into a set of payments denoted by Pay(HAP)={pay(user_id), pay(OLSP_id), pay(advertiser_id), pay(contentprovider_n), . . . etc.} which identifies all parties involved in sharing the payment for that particular access pair and computes the apportioned payments. The final total payment to and from each party is computed by adding together the payments for all the access pairs.

The payment formula among the parties involved can be defined based on a specific business model. Those skilled in the art will appreciate that various billing methods are possible based on the logs provided by the OLSP proxy server 5.

For each session, two or more sub-sessions SS, each consisting of (user_id, session_id, hap_id, sub_session_id), can be defined. The sub-session SS contains a set of parameters that can be tracked based on the proxy server logs. The parameters applicable to billing may include:

the requester address,
hyperlink source,
hyperlink target,
time stamp of the access,
message size, and
transfer status.

The requester address is the network address (IP address) of the user's client computer. Hypertext objects are usually accessed through hyperlinks embedded in another hypertext object, such as an HTML file displayed on the browser that the user employs. As discussed hereinabove, the hyperlink target, as denoted by V_next_stop, is the requested object or page and the hyperlink source, as denoted by V_current_stop, is the object or page which refers to (exposes) the target. Both hyperlink source and hyperlink target are typically represented by a universal resource identifier (URI) or universal resource locator (URL) in HTTP and, as described, they together form a hyperlink access pair. The time stamp is the time when the requested hypertext object is processed and sent back from the proxy server.

In order to bill the user (and/or other participating parties) based on actual usage, the hyperlink access pair, time stamp, URL, transfer status and transfer message size are used. Because the hyperlink target indicates the location of the content requested, the billing formula can identify the target content provider as being responsible for payment. Also, because the hyperlink source indicates the present URL content, the billing formula can identify the source content provider as being responsible for payment. Because the time stamp indicates the time that the Web server processes the request, the billing formula can be a function of the connection time, peak time, off-peak time, etc. Finally, because the URL transfer status, the transfer message size and the duration of the transfer subsessions as measured from time stamp to time stamp,—and cancel "the actual" and substitute—an estimated indicate the actual network bandwidth that is used by the client, the billing formula can be based substantially on an estimate of the actual network bandwidth usage.

The following are two log entries from separate logs recording a particular request to an OLSP proxy server 5. An access log records information about a page access (or "hit") A referrer log records information about the page which referred the client to the accessed page.
192.168.1.26—[01/Oct/1996:08:10:20 +0600] "POST/cgi-in/db2www/col_login.d2w/report HTTP/1.0" 200 2544

The text above depicts a typical access log entry created by a proxy server in response to a client request. The information includes inter alia:

the requester address: 192.168.1.26
hyperlink target:/cgi-in/db2www/col_login.d2w/report
time stamp of the access: 01/Oct/1996:08:10:20
URL message transferred size: 2544
URL transfer status: 200.

[01/Oct/1996:08:10:20 +0600] "http://colds.col.watson.ibm.com:2080/cgi-bin/db2www/col_login.d2w/input"

The text above depicts a typical referrer log entry created by a proxy server in response to the client request. The information includes, inter alia:

hyperlink source address: colds.col.watson.ibm.com
time stamp of the access: 01/Oct/1996:08:10:20.

These two log entries indicate that a user login request /cgi-bin/db2www/col_login.d2w/input from IP address 192.168.1.26 to hyperlink target address colds.col.watson.ibm.com through tcp port 2080 was made and that on 01/Oct/1996:08:10:20, a 2544 bytes login report response /cgi-in/db2www/col_login.d2w/report were transferred to client IP address 192.168.1.26 successfully.

The hyperlink source colds.col.watson.ibm.com:2080/cgi-bin/db2www/col_login.d2w/input and the hyperlink target colds.col.watson.ibm.com:2080/cgi-bin/db2www/col_login.d2w/report together form a hyperlink access pair represented by (V_current_stop, V_next_stop), where V_current_stop=colds.col.watson.ibm.com:2080/cgi-bin/db2www/col_login.d2w/input represents a login screen that the user viewed. After the user logged in and clicked the submit button, the login request was transferred to the server colds.col.watson.ibm.com through tcp port 2080. The response URL represented by V_next_stop=colds.col.watson.ibm.com:2080/cgi-bin/db2www/col_login.d2w/rep ort was transferred back to the client computer.

The following are referrer log entries for a user login session:

[01/Oct/1996:08:10:20 +0600]
"http://colds.col.watson.ibm.com:2080/cgi-bin/db2www/col_login.d2w/input"

[01/Oct/1996:08:10:23 +0600]
"http://colds.col.watson.ibm.com:2080/cgi-bin/db2www/col_login.d2w/report"

[01/Oct/1996:08:10:57 +0600]
"http://colds.col.watson.ibm.com:2080/cgi-bin/db2www/col_pc_ad d.d2w/input"

[01/Oct/1996:08:10:59 +0600]
"http://colds.col.watson.ibm.com:2080/cgi-bin/db2www/col_pc_ad d.d2w/report."

The following are access log entries for the same user login session:

192.168.1.26—[01/Oct/1996:08:10:20 +0600] "POST/cgi-bin/db2www/col_login.d2w/report HTTP/1.0" 200 2544

192.168.1.26—[01/Oct/1996:08:10:23 +0600] "POST/cgi-bin/db2www/col_pc_add.d2w/input HTTP/1.0" 200 2918

192.168.1.26—[01/Oct/1996:08:10:57 +0600] "POST/cgi-bin/db2www/col_pc_add.d2w/report HTTP/1.0" 200 2433

192.168.1.26—[01/Oct/1996:08:10:59 +0600] "POST/cgi-bin/db2www/col_logoff.d2w/report HTTP/1.0" 200 2928.

The corresponding traversal path P(user_id, session_id_s) can be computed as (col_login.d2w/input, col_login.d2w/report, col_pc_add.d2w/input, col_pc_add.d2w/report, col_logoff.d2w/report). This traversal path indicates all the hypertext objects visited by the user during that login session identified by session_id_s. These terms mean:

col login.d2w/input: user login submitted col_login.d2w/report: user login approved col_pc_add.d2w/input: user requested a pc component col_pc_add.d2w/report: user pc component request approved col_logoff.d2w/report: user logoff submitted.

The following table describes the usage records for a user with IP address 192.168.1.26. A network bandwidth-based usage can be derived from this table. As can be seen, a total of 10823 bytes were transferred successfully to the user with IP address 192.168.1.26 in a span of 39 seconds.

| IP address | Time Stamp | Target Object | Target Size | Transfer Status |
| --- | --- | --- | --- | --- |
| 192.168.1.26 | 01/Oct/1996:08:10:20 | col_login.d2w/report | 2544 | 200 |
| 192.168.1.26 | 01/Oct/1996:08:10:23 | col_pc_add.d2w/input | 2918 | 200 |
| 192.168.1.26 | 01/Oct/1996:08:10:57 | col_pc_add.d2w/report | 2433 | 200 |
| 192.168.1.26 | 01/Oct/1996:08:10:59 | col_logoff.d2w/report | 2928 | 200 |
| | | total transfer size | 10823 | |

The following table shows a possible scenario for sharing the usage billing among the user, OLSP and PC component advertiser. Here, the OLSP pays for the login and logoff screen transfer, the advertiser pays for the page transferred for the user's purchase of a pc component, and the user pays none or even gets a bonus from the OLSP who may in turn get a bonus from the advertiser because the OLSP enabled this business transaction.

| Events | Time Stamp | User Paid | OLSP Paid | Advertiser Paid |
|---|---|---|---|---|
| col_login.d2w/report | 01/Oct/1996:08:10:20 | bonus | 2544 | |
| col_pc_add.d2w/input | 01/Oct/1996:08:10:23 | | | 2918 |
| col_pc_add.d2w/report | 01/Oct/1996:08:10:57 | | bonus | 2433 |
| col_logoff.d2w/report | | | 2928 | |

The following table shows a multiparty billing method with peak and off-peak time capability. This example assumes the start time of the peak hour is 08:10:30. So the OLSP will pay a function of 2544 bytes for three seconds in non-prime time rate and a function of 2928 bytes in prime time rate. The advertiser will pay a function of 2918 bytes in non-prime time rate, 2433 bytes in prime time rate, plus some bonus to the OLSP.

| Events | Time Stamp | User Paid | OLSP Paid | Advertiser Paid | Prime Time |
|---|---|---|---|---|---|
| col_login.d2w/report | 01/Oct/1996/:08:10:20 | | 2544 | | no |
| col_pc_add.d2w/input | 01/Oct/1996:08:10:23 | | bonus | 2918 | no |
| col_pc_add.d2w/report | 01/Oct/1996:08:10:57 | | bonus | 2433 | yes |
| col_logoff.d2w/report | 01/Oct/1996:08:10:59 | | 2928 | | yes |

The following table shows a scenario for sharing the usage billing among the user, OLSP and the PC component advertiser when part of the transfer was unsuccessful. Here, the OLSP will pay for the part of the bill corresponding to the unsuccessful transfer event.

| Events | Time Stamp | User Paid | OLSP Paid | Advertiser Paid | Transfer Status |
|---|---|---|---|---|---|
| col_login.d2w/report | 01/Oct/1996:08:10:20 | | 2544 | | good |
| col_pc_add.d2w/input | 01/Oct/1996:08:10:23 | | | 2918 | good |
| col_pc_add.d2w/report | 01/Oct/1996:08:10:57 | | 2433 no bonus | | bad |
| col_logoff.d2w/report | 01/Oct/1996:08:10:59 | | 2928 | | good |

To describe the billing algorithm, the following data formats for the relevant fields are shown for the proxy server log tables, including the referrer log table and the access log table. The referrer log table has the following fields:

hyperlink source server URL (SURL) : varchar(32-bit) (e.g. colds watson. ibm.com/cgi-bin/db2www/col_login.d2w/input)

time stamp of the access (TS) : dd/mm/yr:hr:min:sec (e.g. 01/Oct/1996:08:10:20). The access log table has the following fields:

the customer IP address (CIP): IP1.IP2.IP3.IP4: integer hyperlink target server URL (TURL): varchar(32-bit) (e.g. http://colds.watson.ibm.com/cgi-bin/db2www/col_login.d2w/report)

time stamp of the access (TS): dd/mm/yr:hr:min:sec

RL message transferred size (MS): integer

URL transfer status: integer (MTS): integer.

The following is a database view created based on the above two log tables. This view will be referred to for the following billing algorithm:

| CACNO | CIP | TS | SURL | TURL | MS | MTS |
|---|---|---|---|---|---|---|

CACNO stands for customer account number.

Figure 2A:
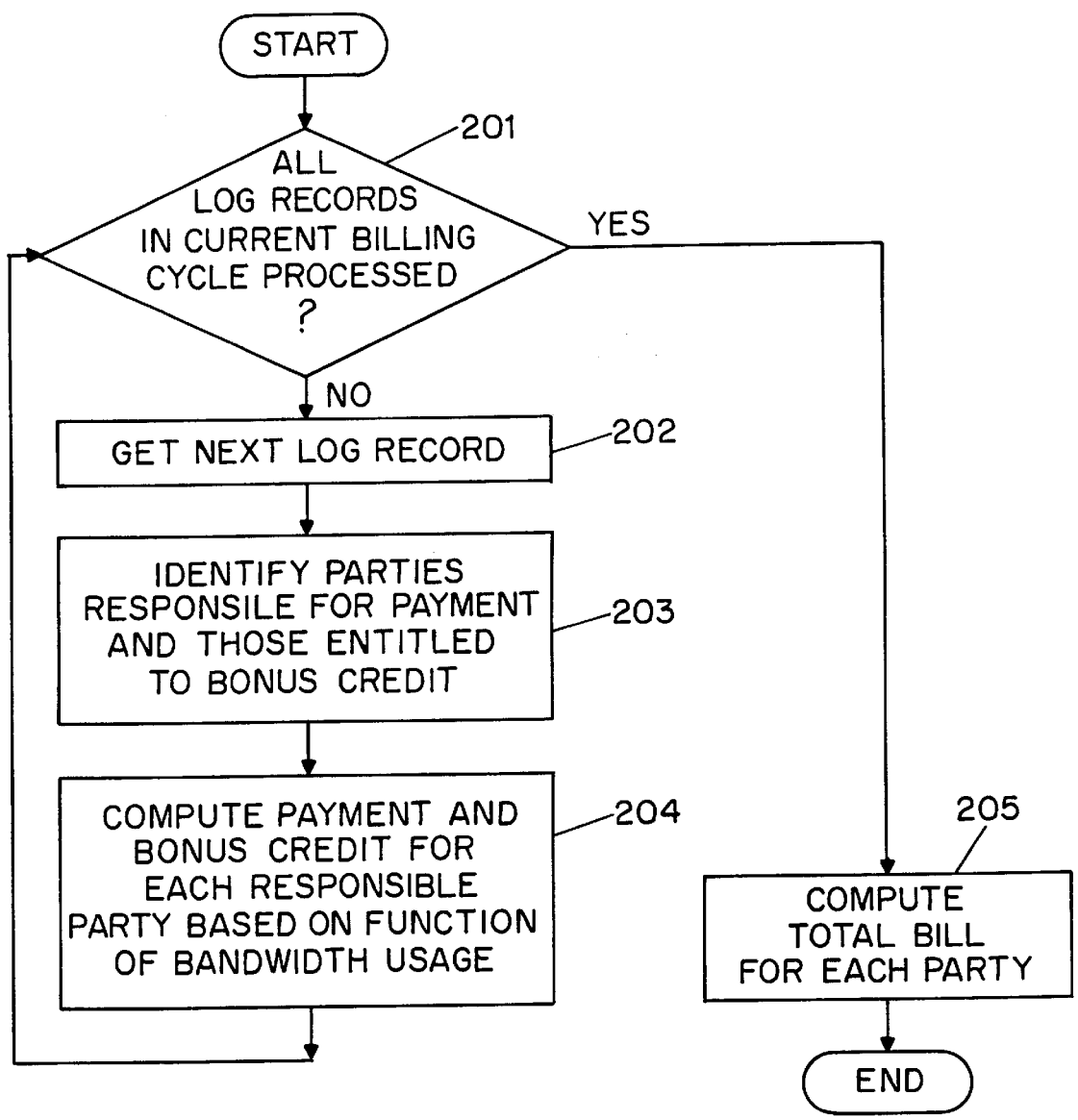
FIG. 2a is a flow diagram of a preferred embodiment of the multiparty usage-based billing method of the present invention.

FIG. 2a shows the flow diagram of a preferred embodiment of the multiparty usage-based billing method according to the present invention. This method implements the usage-based multiparty billing logic 9 stored as shown in FIG. 1. In each billing cycle (e.g. a month), all the log records described hereinabove which have been stored during the cycle are processed to compute the total bill for all the parties responsible for payment. In step 201, the billing logic determines if there are still log records that need to be processed. If so, the next log record is retrieved in step 202.

For each log record, all the parties responsible for payment and all the parties entitled to receive bonus credit for the corresponding web page access are identified in step 203.

Figure 2B:
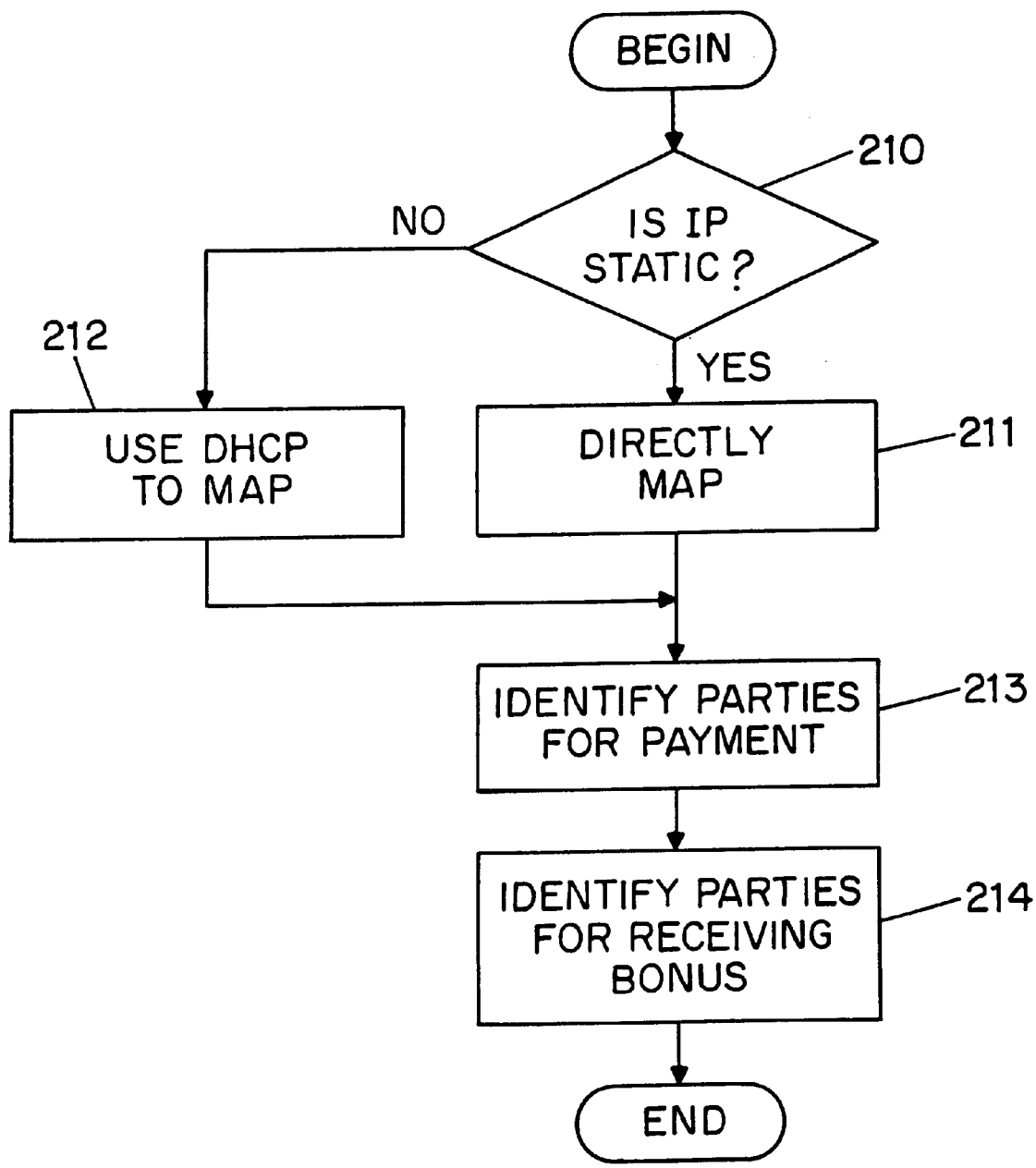

FIG. 2b is a more detailed flow diagram of step 203 of FIG. 2a. In step 210, a determination is made whether the customer IP address (CIP) is static or dynamic. For example, dial-in lines typically use dynamic IP addresses whereas leased lines use assigned static IP addresses. The OLSP can identify whether a CIP, which is stored in log data, is static or dynamic. If the IP address is determined to be static, the IP address is directly mapped to a customer account number (CACNO) in step 211. If the IP address is determined to be dynamic, a DHCP (dynamic host configuration protocol) program can resolve the dynamic IP mapping via a unique identifier to a CACNO in step 212. In step 213, the parties who are paying the bill are identified. This can be accomplished, based on the particular billing function (Pay (HAP)), by ascertaining the target URL (TURL) contained in the access log. In step 214, the parties entitled to receive bonus points are identified. Similarly this can be accomplished, based on the particular billing function (Pay (HAP)), by ascertaining the source URL (SURL) contained in the referrer log.

Continuing in FIG. 2a, after all the parties involved are identified, payment and bonus credit are calculated for each party in step 204 based on a prespecified function (e.g. Pay(HAP)) of the transferred message size (MS) of the log record including the time stamp which can be used to estimate a bandwidth usage. The calculation of payment or bonus credit is executed only if the message transfer status (MTS) is successful. Otherwise, no payment will be charged nor bonus credited to any of the parties. Depending on the time stamp (TS), different pricing can be applied for the same message size. For example, a 2 MB message may cost 20 cents during the daytime but may cost only 10 cents during the nighttime. Different pricing can also be applied based on the duration of each subsession. Because the log data in the access and referrer logs contain sufficient information to identify user sessions, each consisting of a sequence of subsessions, the duration of a subsession represents the time period between two consecutive user requests. Since requests are initiated dynamically by a user based on real-time interactions, the duration of any subsession is controllable by the user. Furthermore, based on the client profile, different pricing can also be applied according to different service levels such as transmission speed (e.g. pay more for high speed communication), real-time support (e.g. stock quotes), content filtering (e.g. specification of content to be received) and advertisement receipt selection (e.g. no advertisements). After all the log records are processed, then the total bill for each customer and for any other party responsible for payment is calculated in step 205, taking into account any bonus credited to them.

If the cost for an access may be shared by multiple parties, it is preferable to indicate, on the object linked to the web page to be accessed, whether the user is responsible for payment of a portion of the access bill and, if yes, his/her share of the charge. This provides an incentive to users to access more web pages on the internet. This distinctive indication can be accomplished via creating different appearances of object linkages through coloring, special marks or graphical representations as explained below with respect to FIG. 3a. For example, an image of an advertisement can be modified to add the information about the billing parties and the modified image can be stored (cached) in disk device 8 at the OLSP proxy server 5. When the web page containing the advertisement is displayed by the web browser on a client computer, the advertisement image will be requested from the proxy server 5. The proxy server 5, upon receiving the request for the image, returns the locally cached modified image containing the billing information. In the preferred embodiment, the web page containing the advertisement image is not changed. Therefore, there is no requirement of prescanning or analyzing the web pages and altering their content. Only the advertisement image files are being changed. This can be achieved by substituting the image file with another one having the same URL, but with the billing information added. Since the modified image files are stored at the proxy server, the OLSP can manage the splitting of access charges among the user and any other participating parties based on the source web page and the destination (target) of the HTTP link associated with each advertisement image file.

Figure 3A:
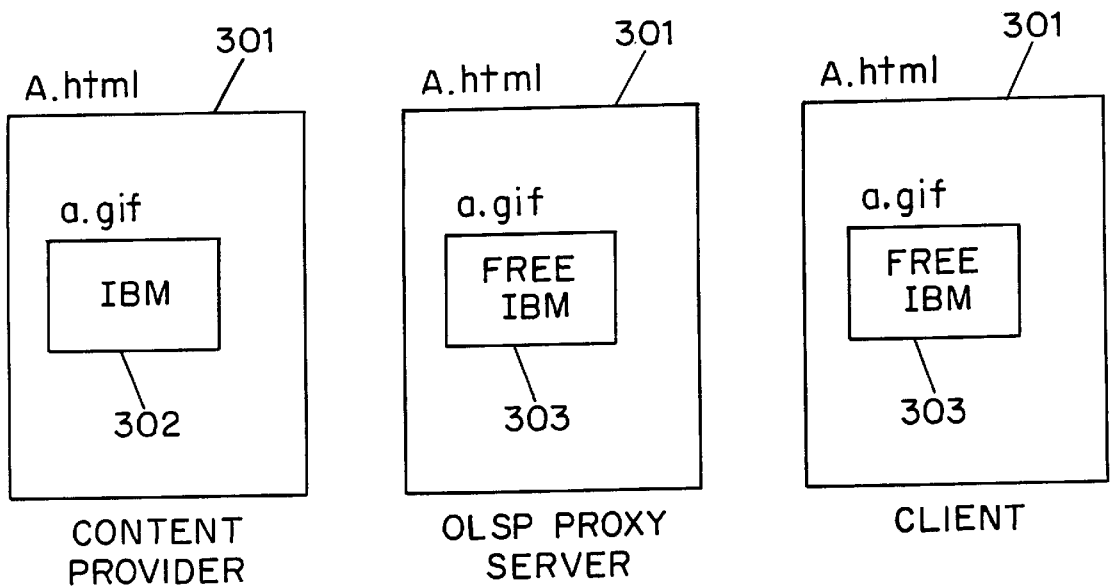
FIG. 3a is a diagram of different appearances of a hypertext page in accordance with a preferred embodiment of the present invention.

FIG. 3a shows a diagram of different appearances of a hypertext page which allow the proxy server to indicate whether the viewer of the page or another party is responsible for payment. A hypertext page A.html 301 contains an advertisement linking to an IBM web page. The advertisement image is a gif file called a.gif 302. When a user at client computer 1 requests page A.html 301, the proxy server 5 can request this page from the content provider 4 or it can fetch the page from its cache in disk drive 8. Further, when the proxy server 5 sends page A.html 301 to the client computer 1, it can also send the modified image a.gif 303 from its cache in disk drive 8. The appearance of a.gif 303 will be different from a.gif 302. For instance, in FIG. 3a, a.gif 302 indicates to the user that the IBM page will be free of charge if the user clicks on this advertisement. The party which is responsible for payment can be recorded elsewhere in the proxy server and charged for the payment during the bill processing step 203 in FIG. 2a. As noted above, the different appearances of the cached hypertext objects can be highlighted through different coloring, special marks or graphical representations. Note again that for an HTML-based web page A.html 301, the replacement of a.gif 302 by a.gif 303 does not require prescanning and analyzing the content of the web page A.html. It can simply be accomplished by fetching the a.gif 303 from the proxy server instead of obtaining a.gif 302 from the content provider. No change is needed to the object linkage in A.html 301, since the file name is still a.gif, only with a different appearance.

Any party responsible for payment can send a set of gif files to the proxy server. These gif files are then used to remap original gif files when requested by a user. In accordance with the present invention, the payment can be shared by all parties involved, including the on-line service provider, the content provider, the user and the advertiser. The proxy server can also provide a different service level by eliminating all advertisements from a hypertext page for a user. Namely, the proxy server 5 can eliminate a.gif 303 from A.html 301 by not sending a.gif 303 to the client computer 1.

Figure 3B:
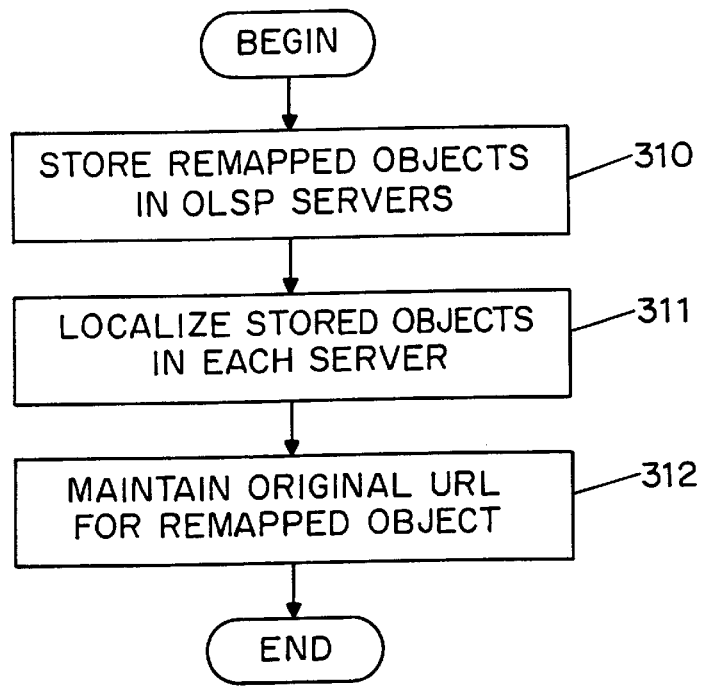
FIG. 3b is a flow diagram of a method according to another preferred embodiment of the present invention.

FIG. 3b is a flow diagram of a method according to a preferred embodiment of the present invention for remapping objects to indicate billing responsibility. This method permits the deployment of a hierarchical set of proxy servers, where the remapping of objects can be localized and the same original name (URL) for a remapped object can be used. For example, car dealers in the area of White Plains, N.Y. and Orlando, Fla. belonging to a single car dealership chain can together place advertisements on a national content provider's web page. The dealers will send separate localized advertisement gif files to their respective local OLSPs. In step 310, the OSLP stores the remapped objects in its multiple proxy servers. In step 311, when users access the content provider's web page exposing the advertisement, the advertisement will be remapped to an advertisement with localized appearance by the respective local OLSP. In step 312, the original URL for a remapped object is the same regardless of the particular OLSP from which a user accessed the object. When a user clicks on a page containing an advertisement gif file, the OLSP then selects the localized version of the gif file for display by the user's browser. In this manner, the car dealers can have local customers viewing their advertisement and will have billing responsibility for the accesses by their local customers only.

While certain embodiments of the present invention have been described hereinabove various modifications and improvements will occur to those skilled in the art. Thus, it should be understood that the preferred embodiment has been provided as an example and not as a limitation. The scope of the invention is defined only by the appended claims.

We claim:

1. A method for billing participating parties for user access to the internet, comprising the steps of:
   identifying, for each access, at least one of the participating parties as being responsible for the billing, the identifying step including the step of identifying a hyperlink source and a hyperlink target for each access;
   allocating a share of the billing to each responsible participating party based on a predetermined function; and
   computing a billing amount for each responsible participating party based on a function of the share and at least the hyperlink source and the hyperlink target.

2. The method of claim 1 wherein the computing step comprises the step of computing the billing amount based on a time of day of each access.

3. The method of claim 1 wherein the identifying step comprises the step of identifying users based on a static IP address or a dynamic IP address.

4. The method of claim 1 wherein the computing step comprises the step of computing the billing amount for a user session comprising a sequence of subsessions, associated with an access, which are dynamically initiated and terminated by the user.

5. The method of claim 4 wherein each of the subsessions has a duration and the computing step comprises the step of computing the, billing amount based on the duration of each subsession.

6. The method of claim 1 wherein the computing step comprises the step of tracking an actual size of a data transfer associated with a web page access and computing the billing amount of each responsible participating party as a function of the actual size.

7. The method of claim 6 wherein said tracking step comprises the step of analyzing access logs and referrer logs to identify each web access and corresponding actual size.

8. The method of claim 1 further comprising the steps of:
   identifying at least one of the responsible participating parties as receiving bonus credit; and
   applying the bonus credit to offset any billing amount.

9. The method of claim 8 wherein said bonus credit is based on a function of the hyperlink source.

10. The method of claim 1 wherein the participating parties include a user, an on-line service provider, one or more content providers and/or one or more advertisers.

11. The method of claim 10 further comprising the step of providing free user access to cached object insertions by the on-line service provider.

12. The method of claim 1 wherein said computing step comprises the step of computing a user billing amount based on a function of a user service level.

13. The method of claim 12 wherein the function is based on real-time support, transmission speed, a content filtering requirement, and/or an advertisement selection requirement.

14. The method of claim 1 further comprising the step of indicating, through a client interface on a source web page, whether a user will be responsible for payment of a billing amount for access to a target web page.

15. The method of claim 14 wherein the indicating step comprises the step of presenting different appearances of object linkages indicating whether the client is responsible for the payment of a billing amount.

16. The method of claim 15 wherein the presenting step comprises the step of presenting the appearances of the object linkages through different coloring.

17. The method of claim 15 wherein the presenting step comprises the step of presenting the appearances of the object linkages through special marks.

18. The method of claim 15 wherein the presenting step comprises the step of presenting the appearances of the object linkages through different graphical representations.

19. The method of claim 15, further comprising the steps of:
   remapping objects on the source web pages to indicate whether the user is one of the responsible participating parties;
   storing the remapped objects in a plurality of hierarchically arranged on-line service provider proxy servers;
   localizing the remapping of objects at each proxy server; and
   maintaining the same original URL for a remapped object.

20. The method of claim 15 wherein one of the participating parties is an on-line service provider and the presenting step comprises the step of retrieving a remapped version of the source web page from a cache of an on-line service proxy server associated with the on-line service provider.

21. The method of claim 20 wherein the remapped source web pages containing the object linkages are left intact without the need to prescan and analyze the content of the source web pages and the URL of the target web page is maintained.

22. A computer system for billing participating parties for client access to the internet, comprising:
   means for identifying, for each access, at least one of the participating parties as being responsible for the billing, the identifying means including a means for identifying a hyperlink source and a hyperlink target for each access;
   means for allocating a share of the billing to each responsible participating party based on a predetermined function; and
   means for computing a billing amount for each responsible participating party based on a function of the share and at least the hyperlink source and the hyperlink target.

23. The system of claim 22 wherein the means for computing a billing amount comprises a means for computing the billing amount based on a time of day of each access.

24. The system of claim 22 wherein the means for computing the billing amount comprises means for computing the billing amount for a user session comprising a sequence of subsessions, associated with an access, which are dynamically initiated and terminated by the user.

25. The system of claim 24 wherein each of the subsessions has a duration and the means for computing the billing amount is based on the duration of each subsession.

26. The system of claim 22 wherein the means for identifying comprises means for identifying users based on a static IP address or a dynamic IP address.

27. The system of claim 22 wherein the means for computing the billing amount comprises:
   means for tracking an actual size of a data transfer associated with a web page access and
   means for computing the billing amount of each responsible participating party as a function of the actual size.

28. The system of claim 27 wherein said means for tracking comprises means for analyzing access logs and referrer logs to identify each web access and corresponding actual size.

29. The system of claim 22 further comprising:
   means for identifying at least one of the responsible participating parties to receive bonus credit; and
   means for applying the bonus credit to offset any billing amount.

30. The system of claim 29 wherein said bonus credit is based on a function of the hyperlink source.

31. The system of claim 22 wherein the participating parties include a user, an on-line service provider, one or more content providers and/or one or more advertisers.

32. The system of claim 31 further comprising means for providing free user access to cached object insertions by the on-line service provider.

33. The system of claim 22 wherein said means for computing comprises means for computing a user billing amount based on a function of a user service level.

34. The system of claim 33 wherein the function is based on real-time support, transmission speed, a content filtering requirement, and/or an advertisement selection requirement.

35. The system of claim 22 further comprising a means for indicating, through a client interface on a source web page, whether a user will be responsible for payment of a billing amount for access to a target web page.

36. The system of claim 35 wherein the means for indicating comprises means for presenting different appearances of object linkages indicating whether the client is responsible for the payment of a billing amount.

37. The system of claim 36 wherein the means for presenting comprises means for presenting the appearances of the object linkages through different coloring.

38. The system of claim 36 wherein the means for presenting comprises means for presenting the appearances of the object linkages through special marks.

39. The system of claim 36 wherein the means for presenting comprises means for presenting the appearances of the object linkages through different graphical representations.

40. The system of claim 36, further comprising:

means for remapping objects on the source web pages to indicate whether the user is one of the responsible participating parties;

means for storing the remapping of objects in a plurality of hierarchically arranged on-line service provider proxy servers;

means for localizing the remapping of objects at each proxy server; and means for maintaining the same original URL for a remapped object.

41. The system of claim 36 wherein one of the participating parties is an on-line service provider and the presenting step comprises the step of retrieving a remapped version of the source web page from a cache of an on-line service proxy server associated with the on-line service provider.

42. The system of claim 41 wherein the remapped source web pages containing the object linkages are left intact without the need to prescan and analyze the content of the source web pages and the URL of the target web page is maintained.

43. A method for billing participating parties for client access to the internet, comprising the steps of:

identifying client access events for which more than one participating party is responsible for the billing, the identifying step including the step of identifying a hyperlink source and a hyperlink target for each of the client access events;

allocating a share of the billing to each responsible participating party based on a predetermined function; and computing a billing amount for each responsible participating party for the identified client access events based on a function of the share and at least the hyperlink source and the hyperlink target.

44. A computer system for billing participating parties for client access to the internet, comprising:

means for identifying client access events for which more than one participating party is responsible for the billing the identifying means including a means for identifying a hyperlink source and a hyperlink target for each access of the client access events;

means for allocating a share of the billing to each responsible participating party based on a predetermined function; and means for computing a billing amount for each responsible participating party for the identified client access events based on a function of the share and at least the hyperlink source and the hyperlink target.

* * * * *